(12) United States Patent
Vittu

(10) Patent No.: US 9,973,669 B2
(45) Date of Patent: May 15, 2018

(54) DUAL OVERMOLDED RECONSTRUCTED CAMERA MODULE

(71) Applicant: Apple Inc., Cupertino, CA (US)

(72) Inventor: Julien C. Vittu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

(21) Appl. No.: 14/839,759

(22) Filed: Aug. 28, 2015

(65) Prior Publication Data

US 2017/0064172 A1   Mar. 2, 2017

(51) Int. Cl.
| | |
|---|---|
| *H04N 5/335* | (2011.01) |
| *H04N 5/225* | (2006.01) |
| *G02B 13/00* | (2006.01) |
| *G02B 13/16* | (2006.01) |
| *G02B 7/00* | (2006.01) |
| *G02B 7/02* | (2006.01) |

(52) U.S. Cl.
CPC ......... *H04N 5/2257* (2013.01); *G02B 13/001* (2013.01); *G02B 13/16* (2013.01); *H04N 5/2253* (2013.01); *H04N 5/2254* (2013.01); *H04N 5/2258* (2013.01); *G02B 7/003* (2013.01); *G02B 7/021* (2013.01)

(58) Field of Classification Search
CPC .................................................. H04N 5/2258
See application file for complete search history.

(56) References Cited

U.S. PATENT DOCUMENTS

| | | |
|---|---|---|
| 5,278,726 A | 1/1994 | Bernardoni et al. |
| 6,571,466 B1 | 6/2003 | Glenn et al. |
| 6,906,403 B2 * | 6/2005 | Bolken ................. H01L 23/293 257/678 |
| 6,921,676 B2 | 7/2005 | Ertel et al. |
| 7,199,438 B2 | 4/2007 | Appelt et al. |
| 7,616,250 B2 | 11/2009 | Watanabe et al. |
| 7,796,187 B2 | 9/2010 | Shangguan et al. |
| 7,972,060 B2 | 7/2011 | Guichard et al. |

(Continued)

FOREIGN PATENT DOCUMENTS

WO   WO-2013079705   6/2013

OTHER PUBLICATIONS

Non-Final Office Action, dated Jan. 8, 2016, U.S. Appl. No. 14/611,950.

(Continued)

*Primary Examiner* — Gary C Vieaux
(74) *Attorney, Agent, or Firm* — Womble Bond Dickinson (US) LLP

(57) ABSTRACT

An apparatus and method of producing a dual overmolded camera module. The dual overmolded camera module including a dual overmolded image sensor module having a first image sensor device and a second image sensor device spaced from one another in an x-direction at a predetermined alignment distance, and wherein at least one of the first image sensor device and the second image sensor device have a conductive via formed therethrough and a redistribution layer along at least one side. The dual overmolded camera module further including a first lens assembly and a second lens assembly mounted over respective ones of the first image sensor device and the second image sensor device, and wherein both the first lens assembly and the second lens assembly are aligned with a common target.

13 Claims, 16 Drawing Sheets

(56) References Cited

U.S. PATENT DOCUMENTS

| | | |
|---|---|---|
| 7,990,730 B2 | 8/2011 | Cheng |
| 8,607,444 B2 | 12/2013 | Jarvis et al. |
| 8,890,269 B2 | 11/2014 | Luan |
| 8,934,052 B2 | 1/2015 | Luan |
| 9,013,017 B2 | 4/2015 | Jin et al. |
| 2006/0132644 A1* | 6/2006 | Shangguan ....... H01L 27/14618 348/374 |
| 2008/0219654 A1* | 9/2008 | Border ................ H04N 5/2258 396/89 |
| 2010/0166410 A1* | 7/2010 | Chang ................... G03B 35/00 396/326 |
| 2011/0141337 A1* | 6/2011 | Kuo ....................... G03B 35/10 348/340 |
| 2011/0286736 A1 | 11/2011 | Aizawa et al. |
| 2012/0146170 A1* | 6/2012 | Vigier-Blanc .... H01L 27/14618 257/432 |
| 2012/0274811 A1* | 11/2012 | Bakin .................. H04N 3/1593 348/239 |
| 2013/0320471 A1 | 12/2013 | Luan |
| 2014/0326855 A1* | 11/2014 | Lu ...................... G02B 13/0085 250/208.1 |
| 2015/0054001 A1* | 2/2015 | Oganesian ........... H04N 5/2256 257/82 |
| 2015/0130974 A1* | 5/2015 | Chuang ................ H04N 5/2252 348/262 |
| 2016/0241841 A1* | 8/2016 | Dorot ..................... G03B 35/10 |

OTHER PUBLICATIONS

Apple Inc., Notice of Allowance dated Dec. 5, 2016, U.S. Appl. No. 15/232,532.

Apple Inc., Notice of Allowance dated May 8, 2017, U.S. Appl. No. 15/232,532.

* cited by examiner

DUAL OVERMOLDED RECONSTRUCTED CAMERA MODULE

FIELD

Embodiments related to a dual overmolded camera module are disclosed. More particularly, an embodiment related to a dual overmolded camera module having two image sensor dies molded within the module and associated lens assemblies aligned to a common focal point is disclosed.

BACKGROUND

Camera modules have been incorporated into a variety of consumer electronics devices, including smart phones, mobile audio players, personal digital assistants, and both portable and desktop computers. A typical camera module includes, for example, an image sensor and an associated lens assembly. The lens assembly is used to collect and transmit light from an imaged scene to the image sensor. The image sensor then detects the transmitted light and conveys the information in the form of signals to the device within which the camera module is implemented for further image processing.

In some cases, a single camera module is implemented within the consumer electronic device. In other cases, a consumer electronic device may have two camera modules to provide enhanced imaging capabilities. In the case of two camera modules, the camera modules are single modules, which are manufactured separately with different optical characteristics. In particular, each camera module includes a lens assembly, which is optically aligned separately and independently from the other during manufacturing. The two separate camera modules are then mechanically and optically aligned with one another during a final assembly step. There are, however, many challenges with mechanical and optical alignment of components manufactured separately. In addition, because the modules are separately manufactured, they must be interconnected through separate, individual flex circuits, and powered up individually. Further, the use of individual camera modules increases the overall size of the optical system making it difficult to implement within current low profile devices. This is particularly true where one of the camera modules has a lens with a variable focal length (e.g. a zoom lens), because such lenses have an increased z-height as compared to fixed focal length lenses, and further require additional power to power the lens movement.

SUMMARY

The instant invention is directed to a dual overmolded camera module in which two cameras are overmolded within the module with a desired optical and mechanical alignment thereby eliminating the alignment issues that occur when two separate camera modules are aligned post manufacture. In particular, a camera assembly or module has many variables that must be considered when implementing the camera within a device in order to achieve a high quality image output. For example, the image sensor within the camera must be precisely positioned with respect to the x, y and z axes and the associated lens optical axes must also be properly aligned with one another. When two cameras are used to obtain a single image, not only must the variables associated with each camera individually be considered, but they must be considered in combination to ensure proper image output. These variables become more difficult to address when the camera modules are mechanically and optically aligned separately, post manufacture. The dual overmolded camera module disclosed herein therefore solves this problem by mechanically aligning the image sensors with one another in the x-, y- and z-directions and molding them together at the aligned positions (or predetermined distances with respect to one another), and then optically aligning the associated lens assemblies during manufacturing so that alignment post manufacturing is unnecessary, or otherwise simplified.

In particular, when using two cameras to obtain image data for reconstruction of an image, particularly a zoom or magnified image, the associated lenses must be aligned so that they are looking at the same thing. In addition, the distances between the associated image sensor devices in the x-, y- and z-directions (or x-, y- and z-positions) must be accurate, and this distance taken into account by an alignment chart (and/or an active alignment software algorithm) used for final alignment of the associated lenses. In particular, the alignment chart and/or active alignment software program is designed taking into account the x, y and z distances. In this aspect, it is important that these distances and positions be known and that the image sensors remain at these predetermined distances to ultimately ensure proper image reconstruction. If the cameras are misaligned (e.g. one lens is looking at a different point than the other), the image cannot be properly reconstructed. Since the lens assemblies are aligned on image sensor devices that are already at fixed x, y and z locations or distances (with a very precise and accurate alignment) with respect to one another, alignment is simplified in comparison to separated image sensor modules in which the image sensor locations are not at a predetermined and fixed spacing suitable for image reconstruction. In addition, the precise positioning of the two image sensor devices allows for improved positioning and flatness control, as well as parallelism. Moreover, since the image sensors are already mechanically aligned with respect to one another and the lens assemblies are already aligned with a common target during manufacturing, integration of the dual overmolded camera module within an electronic device is simplified.

In addition, each lens assembly associated with the dual overmolded camera module may have one or more fixed focal length lenses so as to minimize the overall module z-height as well as the power required to operate the cameras. In particular, as previously mentioned, a variable focal length lens (i.e. a zoom lens) typically requires a greater z-height (and sometimes x and y dimensions) than a fixed focal length lens in order to accommodate the lens movement. Moreover, additional power is required to drive the lens movement. In addition, the fixed focal length lenses within the dual overmolded camera module may have different focal lengths, so that a magnified, or "zoom" image, can still be obtained by the module without an active zoom lens. For example, one of the lenses (or lens assemblies) may have a near focal length and the other may have a far focal length; both, however, are aligned with a common target during manufacturing. Since their optical axes are aligned with a common target, the image information transmitted through the lenses to their respective image sensors can be used to analyze and reconstruct a magnified image without the additional z-height and power typically required by an adjustable focal length lens assembly.

In one embodiment, a dual overmolded camera module, particularly for use in portable consumer electronics device applications, is disclosed. In one embodiment, the dual overmolded camera module includes a dual overmolded image sensor module having a first image sensor device and a second image sensor device spaced from one another in an x-direction at a predetermined alignment distance. In one aspect, the predetermined alignment distance is a fixed distance. In addition, at least one of the first image sensor device and the second image sensor device have a conductive via formed therethrough and a redistribution layer along at least one side. The camera module may further include a first lens assembly and a second lens assembly mounted over respective ones of the first image sensor device and the second image sensor device, and wherein both the first lens assembly and the second lens assembly are optically aligned with a common target. For example, an optical axis of the first and second lens assemblies is aligned with the common target. The dual overmolded camera module may include only the first image sensor device and the second image sensor device. The first image sensor device and the second image sensor device may also be aligned with one another at a predetermined alignment distance in a y-direction and/or level with one another in a z-direction. The first lens assembly may have a fixed focal length that is longer than a fixed focal length of the second lens assembly. In addition, the dual overmolded camera module may be one inseparable unit operable to be positioned as one inseparable unit within an electronic device. The first image sensor device and the second image sensor device may be maintained at the predetermined separation in the x-direction within the dual overmolded camera module by the mold material. In addition, the mold material may occupy an entire space between the first image sensor device and the second image sensor device within the dual overmolded camera module. The first image sensor device and the second image sensor device may also be aligned with respect to one another in a y-direction.

In an embodiment, a method of producing a dual overmolded camera module assembly is provided. The method includes forming a mold material around a first image sensor device and a second image sensor device to produce a dual overmolded image sensor module. The first image sensor device and the second image sensor device are molded at a fixed predetermined alignment distance from one another. The method further includes positioning a first lens assembly over the first image sensor device within the dual overmolded image sensor module and aligning a first optical axis of the first lens assembly with an alignment target. The method also includes positioning a second lens assembly over the second image sensor device within the dual overmolded image sensor module and aligning a second optical axis of the second lens assembly with the alignment target. The method further includes, after aligning, mounting the first lens assembly and the second lens assembly to the dual overmolded image sensor module to produce a dual overmolded camera module. In one aspect, the predetermined alignment distance is along an x axis of the dual overmolded image sensor module. The first image sensor device and the second image sensor device are held at fixed positions with respect to one another by the mold material of the dual overmolded image sensor module during an imaging operation of the dual overmolded camera module. In further aspects, the first lens assembly has a fixed focal length, and in some cases, the second lens assembly has a fixed focal length, with the focal length of the first lens assembly being different than that of the second lens assembly. In some cases, the focal length of the first lens assembly is longer than a focal length of the second lens assembly so that a magnified image may be reconstructed from the imaging information. Still further, the first image sensor device and the second image sensor device are aligned with one another along a y axis or z axis of the dual overmolded image sensor module. In addition, each of the first image sensor device and the second image sensor device may have a conductive via formed therethrough to provide an electrical connection between a top side and a bottom side of the first image sensor device and the second image sensor device. Still further, a redistribution layer may be formed along the bottom side of each of the first image sensor device and the second image sensor device. The dual overmolded camera module may be positioned within an electronic device.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

Embodiments describe dual overmolded camera module assemblies, particularly for use in portable consumer electronics device applications. However, while some embodiments are described with specific regard to integration within mobile electronics devices, the embodiments are not so limited and certain embodiments may also be applicable to other uses. For example, a dual overmolded camera module having two image sensor devices as disclosed herein may be incorporated into an electronic device that remains at a fixed location, or is used in relatively stationary applications, e.g., as a lens in a multimedia disc player or desk top device having a display, for example, a computer.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment", or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description, such as "top" and "bottom" may denote a relative position or direction. For example, a "top edge", "top end" or "top side" may be directed in a first axial direction and a "bottom edge", "bottom end" or "bottom side" may be directed in a second direction opposite to the first axial direction. However, such terms are not intended to limit the use of the camera module disclosed herein to a specific configuration described in the various embodiments below. For example, a top side of a camera module or its components (e.g. a die or image sensor) may be directed in any direction with respect to an external environment.

Figure 1:
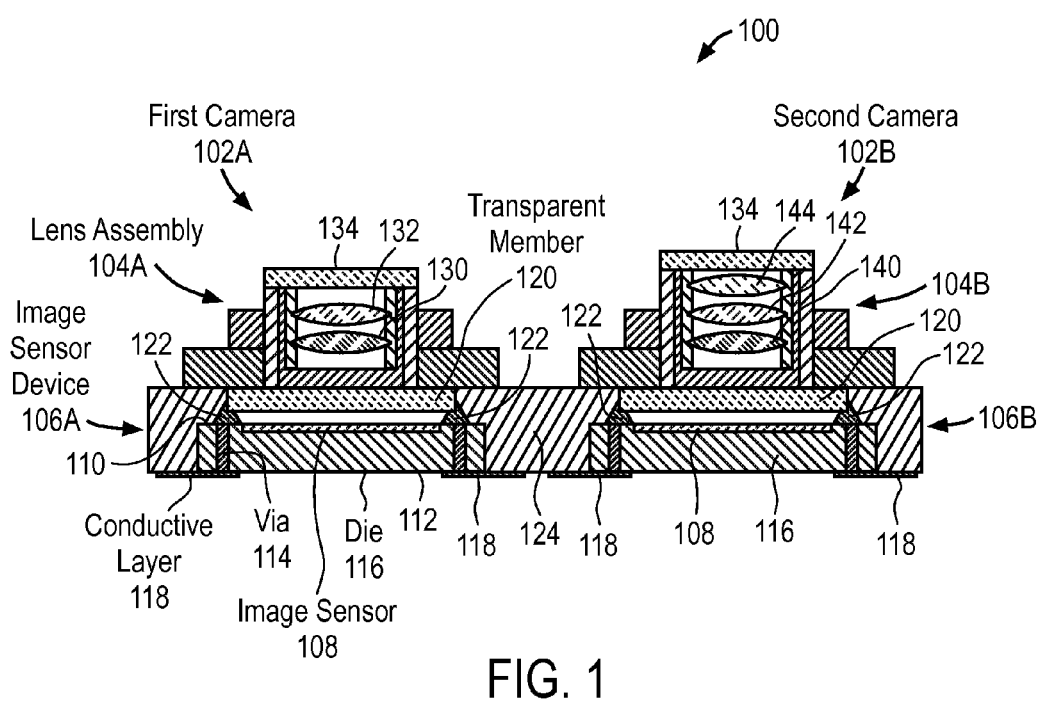
FIG. 1 is a cross-sectional side view of one embodiment of a dual overmolded camera module.

Referring to FIG. 1, FIG. 1 is a cross-sectional side view of one embodiment of a dual overmolded camera module. Camera module 100 may include a first camera 102A and a second camera 102B. First camera 102A may include a lens assembly 104A and an image sensor device 106A. Similarly, second camera 102B may include a lens assembly 104B and an image sensor device 106B. Each of the lens assembly 104A and lens assembly 104B may be positioned above, or over, image sensor device 106A and image sensor device 106B, respectively. Image sensor device 106A and image sensor device 106B may be substantially the same. For example, each of image sensor devices 106A and 106B may include an image sensor 108 mounted to a die 116. Image sensor 108 may be, for example, an array of pixels having photodetectors for detecting light rays transmitted to image sensor 108. Die 116 may be, for example, a block of semiconducting material on, or within which, a functional circuit is fabricated. Die 116 therefore may also be referred to herein as a microelectronic die or an integrated circuit die. Die 116, including image sensor 108, may further be referred to herein as an image sensor die or device and include suitable imaging circuitry.

In the illustrated embodiment, die 116 includes a top side 110 (i.e. first side) and a bottom side 112 (second side) and image sensor 108 is positioned along top side 110. The terms "top side" and "bottom side" are used herein to refer to different sides of die 116, but do not necessarily refer to any particular die orientation. In other words, the "top side" of die 116 may be a side of die 116 facing one axial direction while the "bottom side" faces an opposite axial direction. Moreover, although image sensor 108 is described as being positioned along top side 110 of die 116, image sensor 108 could be positioned along bottom side 112 or both sides of die 116.

Die 116 may further include one or more vias 114 formed through die 116, between the top side 110 and the bottom side 112. In the view illustrated in FIG. 1, each die 116 includes at least two vias 114. Vias 114 may be conductive (e.g. include a conductive material) such that they allow for electrical connections to run through die 116, and between electronic devices or components that may be mounted to the top side 110 and/or bottom side 112 of die 116. In this aspect, vias 114 may be referred to as conductive vias, or more specifically, through-silicon vias (TSV) in cases where die 116 is made of silicon. The ends of vias 114 exposed through the top side 110 or bottom side 112 of die 116 may be electrically connected to a nearby device or component.

In one embodiment, each of image sensor devices 106A, 106B may further include one or more of a conductive layer 118. The conductive layer 118 may be, for example, a redistribution layer formed of a metal material which extends from each of vias 114 outside of die 116 to redistribute an electrical connection outside of die 116 (e.g. to a device mounted near die 116). In the illustrated embodiment, conductive layers 118 are formed on the bottom side 112 of die 116 (i.e. a side of die 116 opposite image sensor 108). Since die 116 includes conductive vias 114 and conductive layers 118 electrically connected to each of the vias 114, a ceramic substrate, which would typically be used to provide electrical connections between the die and other components outside of the die, can be omitted.

Each of image sensor devices 106A and 106B may further include a transparent member 120 positioned over image sensor 108. Transparent member 120 may help to protect image sensor 108. Representatively, in one embodiment, transparent member 120 is a transparent glass or polymer window mounted directly to the top side 110 of die 116. For example, transparent member 120 may be mounted using a mounting material which forms mounting members 122, which also act as spacers to space transparent member 120 a distance from image sensor 108. In some embodiments, the mounting material may be an epoxy resin or other mounting material suitable for directly attaching transparent member 120 to die 116. Die 116 does not need to be mounted within a ceramic substrate therefore transparent member 120 can be directly attached to the top side 110 of die 116, instead of a portion of a ceramic substrate positioned over the die, thereby reducing a z-height of image sensor devices 106A, 106B.

Each of image sensor devices 106A, 106B may further be molded within an overmold or casing 124 to form a dual overmolded image sensor module. In other words, an inseparable module having two image sensor devices molded therein at fixed positions, or distances form one another, by a molding material. For example, the image sensor devices may be molded together within the module using an injection molding process as will be described in more detail in reference to FIGS. 3-11B. Prior to molding, image sensor devices 106A and 106B are aligned with respect to one another in the x-, y- and z-directions (e.g. along the x, y and z axes) so that they are fixed at desired, and predetermined, distances, locations and positions with respect to one another within casing 124. The precise positioning of the image sensor devices 106A, 106B is critical to image reconstruction, and will be described in more detail in reference to FIGS. 4A and 4B.

Casing 124 may conform to the dimensions of each die 116. In other words, casing 124 is formed directly on, and in contact with, surfaces of each die 116. Representatively, casing 124 may be formed by a molding material such that casing 124 conforms to the size and shape of each die 116 and a respective transparent member 120. The molding material may be, for example, a polymer, an elastomer, or a thermoplastic. For example, the molding material may be a polymer such as an epoxy resin, which cures to form an epoxy casing 124. It is noted that casing 124 should surround and contact all exposed sides of each die 116 and transparent member 120, and also overlap outer portions of the top surface 110 of each die 116, but not overlap the top surface of transparent member 120 so that light can be transmitted through transparent member 120 to image sensor 108. In addition, the molding material of casing 124 entirely fills, or otherwise occupies, a space between image sensor device 106A and image sensor device 106B such that there is no gap or open space between image sensor devices 106A, 106B. Said another way, image sensor devices 106A, 106B are held together by the molding material as a single unit, referred to herein as a dual overmolded image sensor device module or dual overmolded image sensor module.

Representatively, casing 124 may be formed by an overmolding or injection molding process in which each image sensor device 106A, 106B is enclosed within a mold cope and a mold material is injected around the die 116 and transparent member 120. Forming of casing 124 as an overmolded structure around each die 116 and transparent member 120 helps to reduce the overall x, y and/or z dimensions of the dual overmolded image sensor module in several ways. Said another way, casing 124 helps to reduce a width, length, and/or height dimension of the dual overmolded image sensor module. For example, because casing 124 is molded directly to exposed surfaces of each die 116 and its respective transparent member 120, gaps around die 116, which may unnecessarily increase the x, y and/or z dimensions of the dual overmolded image sensor module, and in turn, dual overmolded camera module 100, can be eliminated. For example, an x (width), z (height) and in some cases y (length) dimension of the image sensor devices 106A, 106B may be from 100 microns to 200 microns less than those found in a device that is mounted within a ceramic substrate type carrier. In addition, since a ceramic substrate (which is sometimes used to enclose each die 116) may be omitted, transparent member 120 can be directly attached to each die 116, and in turn encased within casing 124. This, in turn, further reduces a z-height dimension of the dual overmolded image sensor module. Still further, an overlap between casing 124 and the top side 110 of each die 116 can be controlled, and in some cases reduced below that which is seen when a ceramic substrate is used, which in turn may allow for an increase in a surface area of image sensor 108.

Once the dual overmolded image sensor module is complete, i.e., each die 116 and its transparent member 120 are encased within casing 124, lens assembly 104A and lens assembly 104B are attached to the dual overmolded image sensor module to complete the camera module. Representatively, lens assembly 104A may be positioned above, or otherwise over, the image sensor 108 of image sensor device 106A and mounted to casing 124. Similarly, lens assembly 104B may be positioned above, or otherwise over, the image sensor 108 of image sensor device 106B and mounted to casing 124. Lens assembly 104A and lens assembly 104B may be any type of lens assembly suitable for implementation within a camera module. For example, in one embodiment, lens assembly 104A may include a lens stack including lens 130 and lens 132 mounted within a support structure (e.g. a barrel). Lenses 130, 132 may be aligned with image sensor 108 to facilitate transmission and/or focusing of light rays on image sensor 108. External window 134 may, for example, be a transparent glass or polymer window located substantially coplanar with a mobile device housing. Similarly, lens assembly 104B may have a lens stack including lens 140, 142 and 144 aligned with image sensor 108 of image sensor device 106B. Although lens assembly 104A is shown having two lenses 130, 132 and lens assembly 104B is shown having three lenses 140, 142, 144, any number of lenses may be used in each assembly, for example, at least one, two, three, four, five, or more lenses.

Lenses 130, 132 of lens assembly 104A and lenses 140, 142 and 144 of lens assembly 104B may be aligned with a common target so that an image may be reconstructed from image data obtained by cameras 102A, 102B. The lens assembly alignment will be described in more detail in reference to FIGS. 10A, 10B, 11A and 11B.

Still further, in one embodiment, lenses 130, 132 of lens assembly 104A may have a fixed focal length. Similarly, lenses 140, 142, 144 of lens assembly 104B may have a fixed focal length. The focal lengths may, in some cases, be different so that a magnified or zoom image may be obtained. For example, the overall lens focal length of lens assembly 104A may be longer than that of lens assembly 104B. The image data obtained at the different focal lengths may then be reconstructed to obtain a magnified or zoom image in the absence of a variable focal length lens.

Still further, although not illustrated, lens assembly 104A and lens assembly 104B may include numerous lenses, filters, and other optical components aligned along an optical axis to achieve various optical functionalities.

It should further be understood that, although not shown, other components such as flexible circuit boards, voice coil motors, filters, covers, support members, etc. may be connected to dual overmolded camera module 100 to support the various camera operations. In addition, although lens assembly 104A and lens assembly 104B are shown attached to casing 124, it is contemplated that in some embodiments lens assembly 104A and lens assembly 104B may be omitted. For example, in an embodiment where the dual overmolded image sensor module does not require an assembly of lenses for imaging, lens assemblies 104A, 104B may be omitted.

Figure 2:
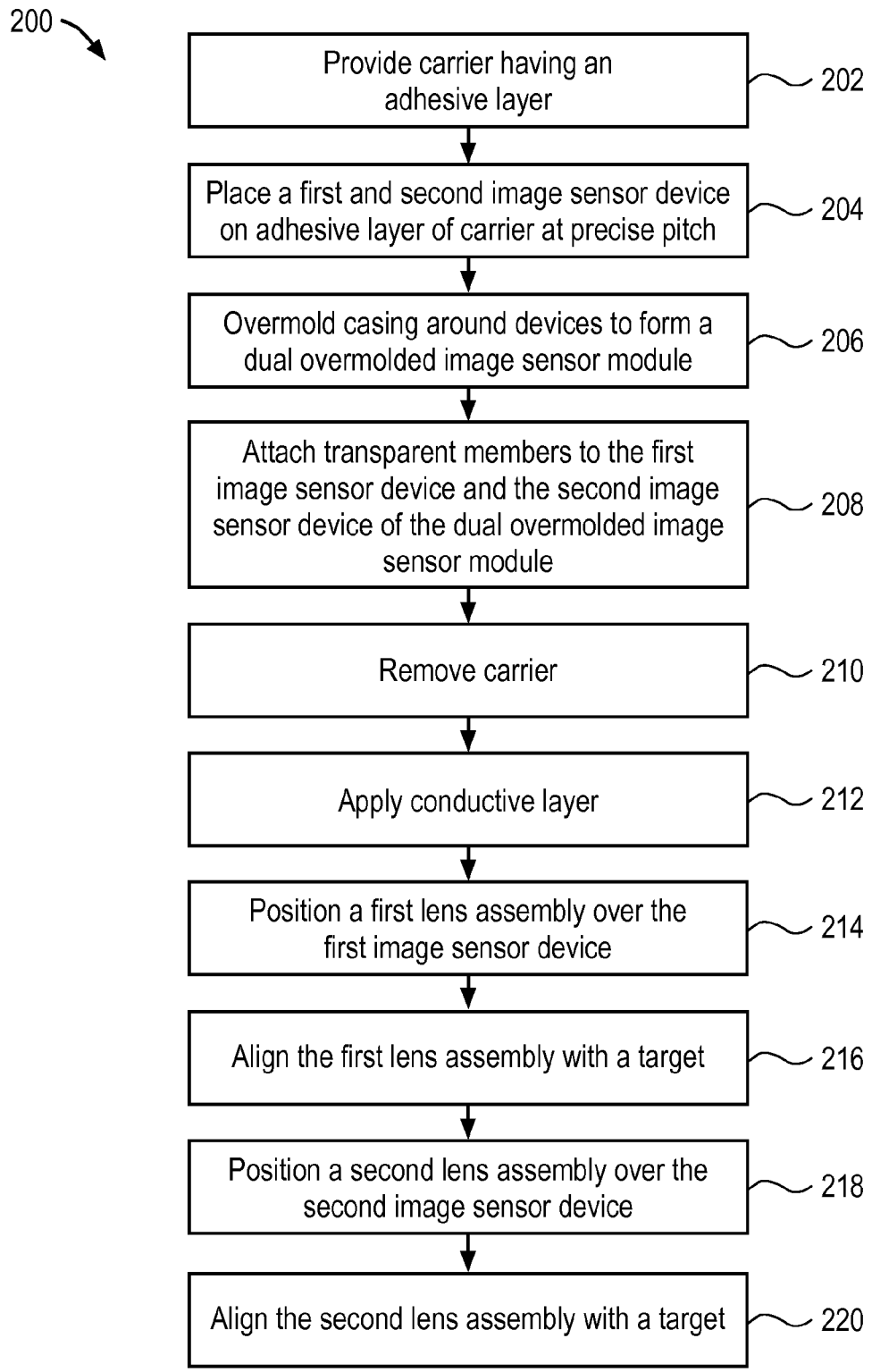
FIG. 2 is a flowchart of a process for producing a dual overmolded camera module in accordance with one embodiment.

FIG. 2 is a flowchart of a process for producing a dual overmolded camera module in accordance with one embodiment. Any one or more of the steps described in process 200 may be used to produce, for example, dual overmolded camera module 100 as described in reference to FIG. 1. Representatively, process 200 may include providing a carrier having an adhesive layer attached thereto (block 202). The carrier may be any type of carrier suitable for carrying an image sensor die or device during a camera module assembly process. For example, the carrier may be a wafer, such as a ceramic wafer, or the like. The adhesive layer may be applied to a surface of the carrier and be made of any type of adhesive material capable of adhering an image sensor die to the carrier. Representatively, the adhesive layer may be a type of adhesive tape laminated to a surface of the carrier.

In one aspect, a first image sensor device and a second image sensor device may be placed on, and attached to, the adhesive layer of the carrier (block 204). Representatively, a pick and place technique may be used to pick two preformed image sensor devices from a batch and then place them in a desired location on the adhesive layer such that the devices are attached to the carrier for subsequent processing operations. The devices may be image sensor devices 106A and 106B as previously discussed in reference to FIG. 1. The image sensor devices may be placed on the carrier such that the side having the image sensor is exposed and facing away from the carrier. In other words, where the image sensor is on the top side of the device, the bottom side of the device is attached to the carrier. In addition, the image sensor devices may be placed on the carrier at a predetermined alignment distance or position along the x axis, or in an x-direction, with respect to one another, as well as along the y and z axes, as will be described in more detail in reference to FIG. 4A and FIG. 4B. Still further, in some embodiments, the first and second image sensor devices may be placed on the carrier such that they are level with one another, or otherwise aligned in a z-direction.

Once the devices are attached to the carrier at the desired locations, a casing is molded around the devices to form a dual overmolded image sensor module (block 206). In other words, an overmolded image sensor module having two image sensor devices molded at fixed positions with respect to one another. For example, in one embodiment, the casing is molded around the devices using an overmolding or injection molding process in which a mold material (e.g. epoxy resin) is injected around the components and then cured to form a dual overmolded image sensor module. In this aspect, the casing itself may serve as an image sensor device carrier during subsequent processing operations.

Once the devices are attached to the carrier, a first transparent member and a second transparent member (e.g. transparent member 120) may be attached to the dual overmolded image sensor module (block 208). The transparent member may be a glass window positioned over a respective one of the image sensor devices. In some embodiments, a glue, epoxy resin, resin or chemical bonding may be used to attach the transparent member to the dual overmolded image sensor module. In some cases, an optional plasma surface treatment technique may be used to facilitate attachment of the transparent member to the dual image sensor device module. For example, a plasma gas may be applied to the die surface to enhance adhesion between the transparent member and the die.

Next, the dual overmolded image sensor module may be removed (e.g. picked) as a single unit from the adhesive so that processing of the bottom side of each image sensor device within the module may occur (block 210). In some cases, either before or after removal of the dual image sensor device module from the carrier, the casing may be cured, such as by a thermal process. Since both sides of the image sensor devices are now exposed, one or more conductive layers can be formed on the surface of the devices to redistribute an electrical connection formed through the die (e.g. vias 114 as shown in FIG. 1) to a nearby device or component (block 212). The conductive layer may, for example, be a redistribution layer that is made of a metal material sputtered with photolithography in a particular pattern along the die and casing.

In one embodiment, process 200 may include the optional step of re-mounting the dual overmolded image sensor module having the added conductive layers to the carrier using the adhesive layer for further processing. Representatively, the further processing may include singulating or separating the dual overmolded image sensor module from other devices within the mold material. For example, the dual overmolded image sensor device may be separated mechanically, such as by sawing through portions of the casing, or a chemical process, such as by a chemical etching process.

Process 200 may further include positioning and/or attaching lens assemblies to each image sensor device within the dual overmolded image sensor module. The lens assembly may, for example, be any of lens assemblies 104A, 104B previously discussed in reference to FIG. 1. Representatively, a manifold assembly having one or more lens assemblies attached thereto may be used to position a first lens assembly over a first image sensor device (block 214). Once in position, the first lens assembly may be optically aligned with the image sensor device and a target (block 216). Similarly, a second lens assembly may be positioned over the second image sensor device (block 218). The second lens assembly may also be optically aligned with the image sensor device and the same target as the first lens assembly (block 220). By optically aligning the lens assemblies with a common target, a single image may be reconstructed from the image data obtained by the two different image sensor devices. The dual image sensor device module having lens assemblies attached thereto may be subjected to a batch curing technique to cure the adhesive or mounting material (e.g. glue) used to attach the lens assemblies to the image sensor devices to form the final camera modules.

Figure 3:
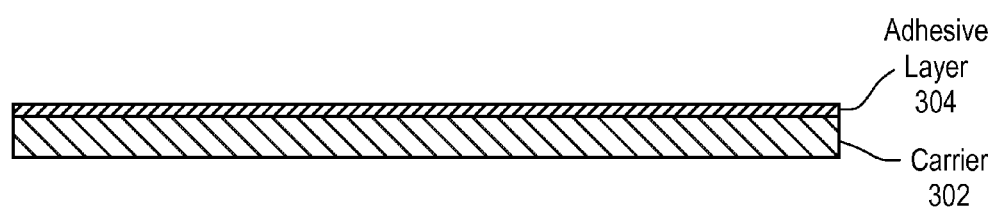
FIG. 3 is a pictorial view illustrating an operation for forming a dual overmolded camera module in accordance with one embodiment.

FIG. 3-FIG. 11B are pictorial views illustrating operations in forming a dual overmolded camera module in accordance with an embodiment. Referring to FIG. 3, FIG. 3 illustrates a carrier 302 having an adhesive layer 304 attached thereto. In one embodiment, carrier 302 may be a wafer or other type of carrier member suitable for supporting image sensor devices during a camera module assembly process as described herein. Adhesive layer 304 may be, for example, a layer of tape having a back side that is laminated to the carrier 302 and an adhesive side exposed. The adhesive side may have adhesive properties sufficient to adhere an image sensor device during a processing operation while also allowing for removal of the device without damaging the device when a sufficient force is applied.

Figure 4A:
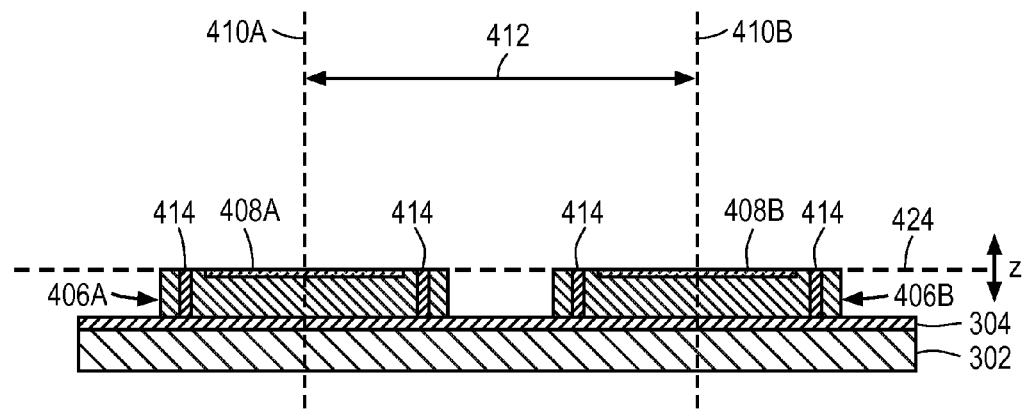
FIG. 4A is a pictorial view illustrating an operation for forming a dual overmolded camera module in accordance with one embodiment.

FIG. 4A illustrates the further processing operation of attaching a first image sensor device 406A and a second image sensor device 406B to the carrier described in FIG. 3. Representatively, image sensor devices 406A, 406B, similar to image sensor devices 106A and 106B described in reference to FIG. 1, are attached to the adhesive layer 304 of carrier 302. Each of image sensor device 406A and image sensor device 406B may be substantially the same. In particular, each of image sensor devices 406A and 406B may include one or more of a via 414 and image sensor 408A, 408B, respectively. In embodiments where the image sensors 408A, 408B are positioned on the top side of image sensor devices 406A, 406B, as illustrated in FIG. 4, the bottom side of image sensor devices 406A, 406B are positioned on and attached to the adhesive layer 304 such that further processing may be performed on the top side of image sensor devices 406A, 406B. In some embodiments, a pick and place technique may be used to place image sensor devices 406A, 406B on adhesive layer 304. For example, each of image sensor devices 406A, 406B may be picked from a batch of preformed image sensor devices and placed at predetermined positions with respect to one another on adhesive layer 304.

Image sensor devices 406A, 406B are placed on the adhesive layer 304 such that they are aligned with one another along the x, y and z axes and are at predetermined positions (or distances) and then fixed at these positions in the subsequent molding step. In other words, a mechanical alignment of the image sensor devices 406A, 406B with respect to one another is performed during manufacturing so that the devices need not be aligned after manufacturing, and the subsequent optical alignment of the lenses is simplified.

For example, image sensor devices 406A, 406B may be aligned at this stage along the z axis so that they are level with one another as shown in FIG. 4A. For example, the image sensors 408A, 408B of image sensor devices 406A, 406B, respectively, are level as shown by dashed line 424, along the z axes of image sensor devices 406A, 406B (as illustrated by dashed lines 410A, 410B corresponding to respective ones of image sensor devices 406A, 406B). In this aspect, one is not higher, or otherwise at a different z-height, than the other. Axes 410A, 410B may be used to illustrate the axes, or center, of respective ones of image sensor devices 406A, 406B, but may also be referred to herein, or otherwise used to demonstrate, a z axis or z-direction of a component with respect to image sensor devices 406A, 406B. In this aspect, since it is known that each of image sensor devices 406A, 406B are at a same z-height, or otherwise level, the subsequent optical alignment of the lens assemblies need not consider, or otherwise compensate for, image sensor misalignments in the z-direction.

In addition, image sensor devices 406A, 406B are aligned at a predetermined alignment distance 412, or pitch, in an x-direction with respect to one another. In other words, image sensor devices 406A, 406B are positioned on the carrier at a predetermined separation in an x-direction. The alignment distance 412, or separation, between image sensor devices 406A and 406B may be measured from a center of image sensor device 406A to a center of image sensor device 406B. The alignment distance 412 is a critical distance or measurement that must be known and precise in order to reconstruct an image using image data from each of image sensor devices 406A and 406B. In other words, the alignment distance 412 is a fixed distance that corresponds to a spacing between image sensor device 406A and 406B, and is maintained within the final camera module which includes both image sensor devices 406A, 406B. As previously discussed, the alignment of the image sensor devices 406A, 406B at the predetermined alignment distance 412 in the x-direction is critical to final alignment. In particular, the alignment chart (and/or the software algorithm) used for final alignment of the lens assemblies with a common target takes into account the predetermined alignment distance in the x-direction. Since the image sensor devices 406A, 406B are fixed at alignment distance 412 during manufacturing as opposed to post manufacturing, the risk of errors in alignment using the alignment chart (or software) are therefore reduced.

Figure 4B:
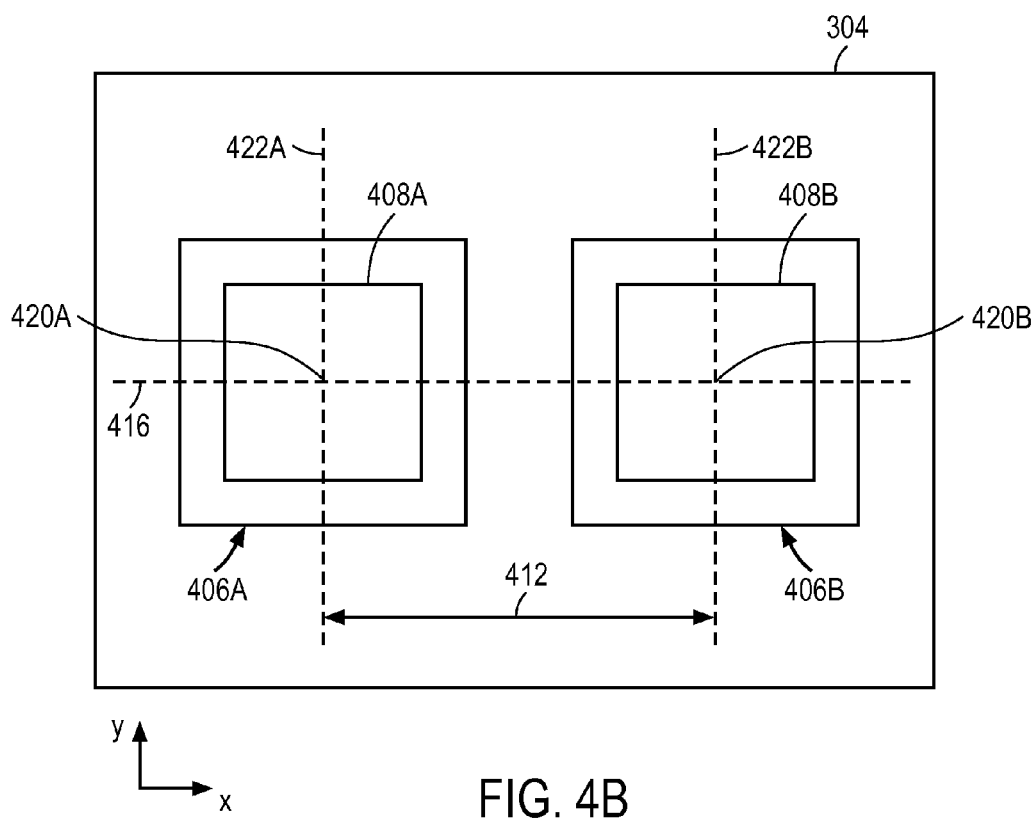
FIG. 4B is a top plan view of the operation illustrated in FIG. 4A.

FIG. 4B illustrates a top plan view of the image sensor device positioning described in FIG. 4A. In particular, from this view, it can be seen that image sensor device 406A has a center point 420A and image sensor device 406B has a center point 420B. The predetermined alignment distance 412 in the x-direction is measured between center point 420A and center point 420B. In addition, from this view, it can be seen that image sensor devices 406A and 406B are aligned along the y axis, or in a y-direction, or at a predetermined alignment distance in the y-direction. In other words, image sensor devices 406A and 406B are at similar positions along their respective y axes 422A and 422B. The alignment of the image sensor devices 406A, 406B at the predetermined alignment distance in the y-direction is also critical to final alignment. In particular, similar to the predetermined alignment distance 412 in the x-direction, the alignment chart (or software algorithm) used for final alignment takes into account the predetermined alignment distance in the y-direction. In this aspect, since it is known that each of image sensor devices 406A, 406B are aligned with respect to one another along the x, y and z axes, or in the x-, y- and z-directions, or otherwise at predetermined distances or positions in the x-, y- and z-directions with respect to one another, and these positions are known, the subsequent optical alignment of the lens assemblies does not require the additional step of mechanical alignment the image sensor devices, or require compensation for misalignments in the x-, y- and z-directions.

In addition, it should be understood that the actual distances or spacing between the image sensor devices 406A, 406B in the x-, y- and z-directions may be any distance or spacing suitable for reconstruction of an image using image sensor devices 406A, 406B. The distances or spacing should, however, be known and fixed during molding of the image sensor devices 406A, 406B together so that they can be used by an alignment chart (or alignment software algorithm) used for final alignment of the camera lens assemblies with a common target. Still further, it should be understood that although image sensor devices 406A, 406B are shown at the same position along the y axis and z axis, in other words the distances between the image sensor devices 406A, 406B as measured along the y axis and the z axis is zero, they may be at different positions or distances with respect to one another. For example, image sensor devices 406A may be spaced a predetermined alignment distance from image sensor device 406B along the y-axis that is greater than zero, and still be considered aligned. What is important is that this distance is known, fixed prior to aligning the associated lens assemblies and/or can be used by the alignment chart (and/or alignment software algorithm) for final alignment.

Figure 5:
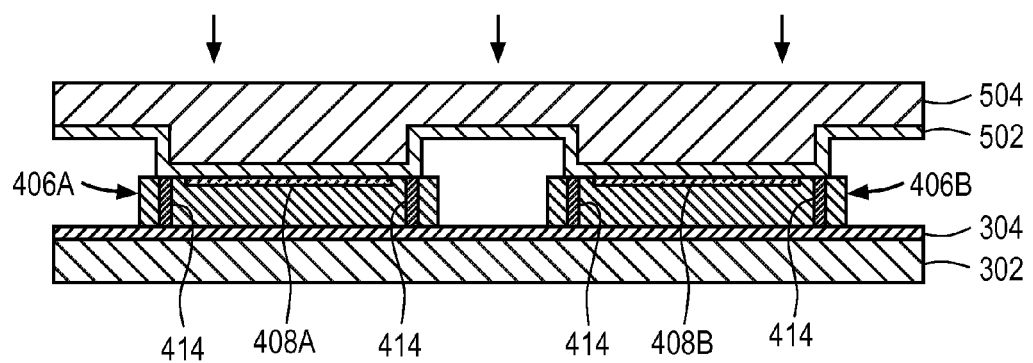
FIG. 5 is a pictorial view illustrating an operation for forming a dual overmolded camera module in accordance with one embodiment.

FIG. 5 illustrates the further processing operation of applying a protective film and mold cope over the aligned image sensor devices of FIG. 4A-FIG. 4B. The protective film 502 may be a layer of material that is removably applied over the exposed sides of image sensors 408A, 408B to protect them during a further processing operation. For example, in one embodiment, protective film 502 may be an adhesive film, which is positioned over image sensors 408A, 408B. Once the protective film 502 is in place, a mold cope 504 may be applied (e.g. lowered) over the protective film 502. The mold cope 504 may serve to enclose the image sensor devices 406A, 406B between mold cope 504 and carrier 302 so that the mold material can be injected around each of image sensor devices 406A, 406B.

Figure 6:
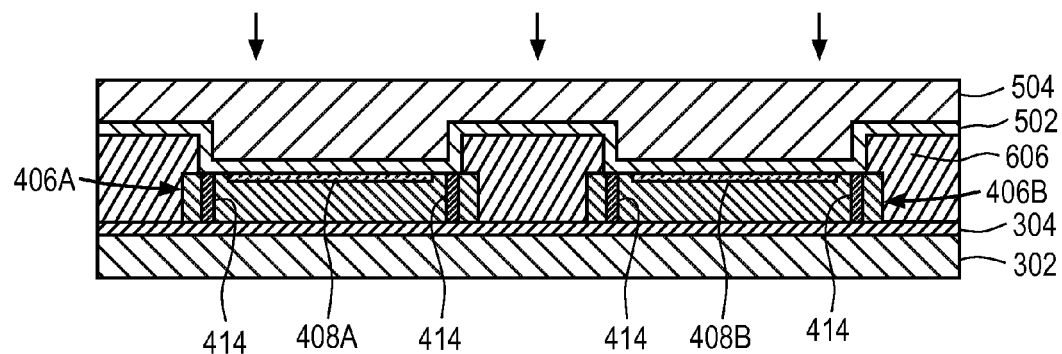
FIG. 6 is a pictorial view illustrating an operation for forming a dual overmolded camera module in accordance with one embodiment.

Representatively, as shown in FIG. 6, a mold material 606 (e.g. an epoxy resin or the like) is injected, poured or otherwise loaded into the space between mold cope 504/ protective film 502 and carrier 302/adhesive layer 304 such that it surrounds each of the image sensor devices 406A, 406B attached to carrier 302. Once injected, the mold material 606 may be cured (such as by a heat) so that it forms a hard casing or overmold around each image sensor devices 406A, 406B.

Figure 7:
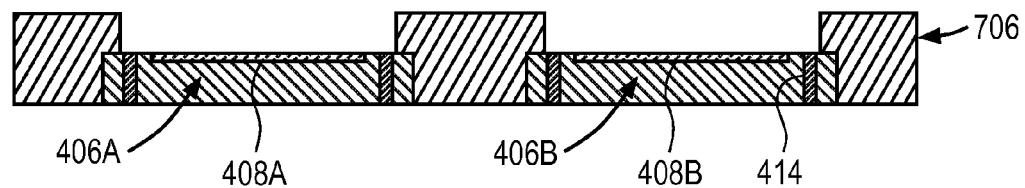
FIG. 7 is a pictorial view illustrating an operation for forming a dual overmolded camera module in accordance with one embodiment.

Once the mold material is cured, the mold cope 504, protective film 502 and carrier 302 (with adhesive layer 304) may be removed to expose the casing having image sensor devices 406A, 406B overmolded therein, in other words a dual overmolded image sensor module 706, as shown in FIG. 7. Since the image sensor devices 406A, 406B are encased within the dual overmolded image sensor module 706, they remain in the same position as they were when attached to the carrier, and further processing may be performed on the image sensor devices 406A, 406B using the casing as the carrier. Any suitable removal steps, and in any order, may be used. For example, in one embodiment, mold cope 504 and protective film 502 are first removed by applying a suitable force to expose the top side of each of the image sensor devices 406A, 406B followed by removal of adhesive layer 304 and carrier 302 to expose a bottom side of each of the image sensor devices 406A, 406B for further processing.

Figure 8:
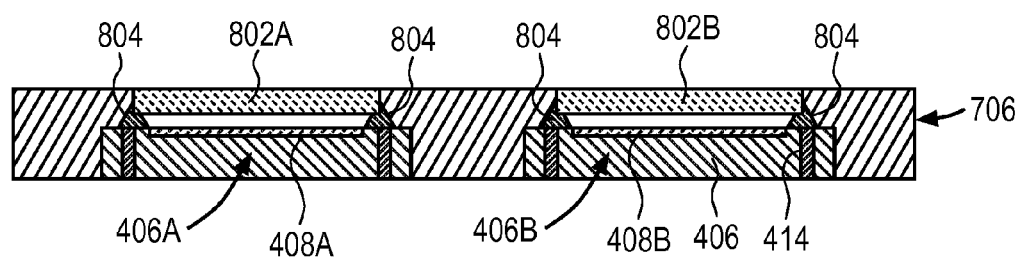
FIG. 8 is a pictorial view illustrating an operation for forming a dual overmolded camera module in accordance with one embodiment.

FIG. 8 illustrates the further processing operation of attaching a transparent member to the devices described in reference to FIG. 7. Representatively, a transparent member 802A and 802B, such as a window made of a glass or other transparent material, is positioned over image sensors 408A, 408B, respectively, and attached to the dual overmolded image sensor module 706 to complete the dual overmolded image sensor module assembly. In one embodiment, transparent members 802A, 802B may be attached using mounting members 804. Representatively, in one embodiment, mounting members 804 may be made of a material that can be, for example, subjected to, or used in connection with, a plasma technique to enhance the attachment between transparent members 802A, 802B and dual overmolded image sensor module 706. Representatively, mounting members 804 may be epoxy or other similarly suitable mounting material. In addition, mounting members 804 should serve as spacers between transparent members 802A, 802B and dual overmolded image sensor module 706 such that a space or gap is formed between the two.

Figure 9:
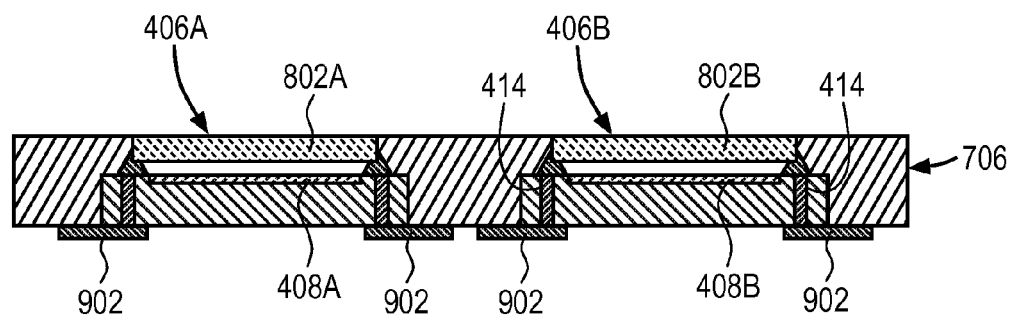
FIG. 9 is a pictorial view illustrating an operation for forming a dual overmolded camera module in accordance with one embodiment.

With the top and bottom surfaces of the dual overmolded image sensor module 706 exposed, further processing on these surfaces can occur. Representatively, FIG. 9 illustrates the further processing operation of applying conductive layers to the image sensor devices within the dual overmolded image sensor module described in FIG. 8. The conductive layers 902 may, for example, be metallization layers applied using a sputtering technique. The conductive layers 902 may serve as redistribution layers that redistribute an electrical connection from the image sensor devices 406A, 406B to other locations outside of the associated device. For example, conductive layers 902 may be formed along a bottom side of each of image sensor devices 406A, 406B, from vias 414 to another location outside of devices 406A, 406B. Once the conductive layers 902 are formed, the dual overmolded image sensor module 706 may be singulated (e.g. sawed), or otherwise separated, from any other devices in cases where the dual overmolded image sensor module 706 is formed as a batch of devices. It should be understood, however, that image sensor devices 406A, 406B within the dual overmolded image sensor module 706 are part of a single inseparable unit held together by the mold material, and are not separated during a sawing operation.

Figure 10A:
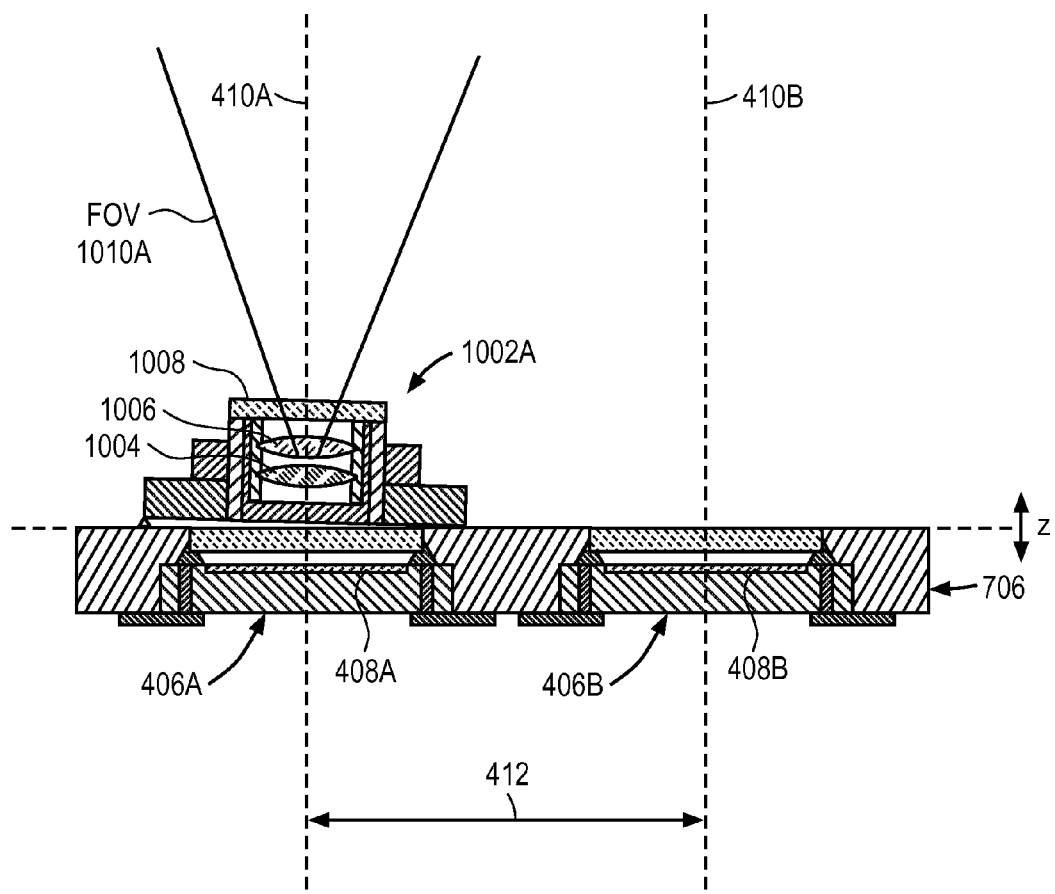
FIG. 10A is a pictorial view illustrating an operation for forming a dual overmolded camera module in accordance with one embodiment.

FIG. 10A illustrates the further processing operation of attaching a lens assembly to one of the image sensor devices within the dual overmolded image sensor module of FIG. 9. Representatively, lens assembly 1002A, such one of those previously discussed in reference to FIG. 1, may be positioned over image sensor device 406A and optically aligned. In particular, lens assembly 1002A may include lenses 1004, 1006 and an external window 1008. The lenses 1004, 1006 may further have a field of view (FOV) 1010A, which defines the angular extent of a scene that can be imaged using the lenses. In addition, lenses 1004, 1006 may be fixed focal length lenses such that the lenses do not move during an imaging operation. The lens assembly 1002A may be attached to the dual overmolded image sensor module 706 using any standard technique. For example, lens assembly 1002A may be positioned over image sensor device 406A and then attached using an adhesive, mechanical, chemical or other suitable attachment technique.

Figure 10B:
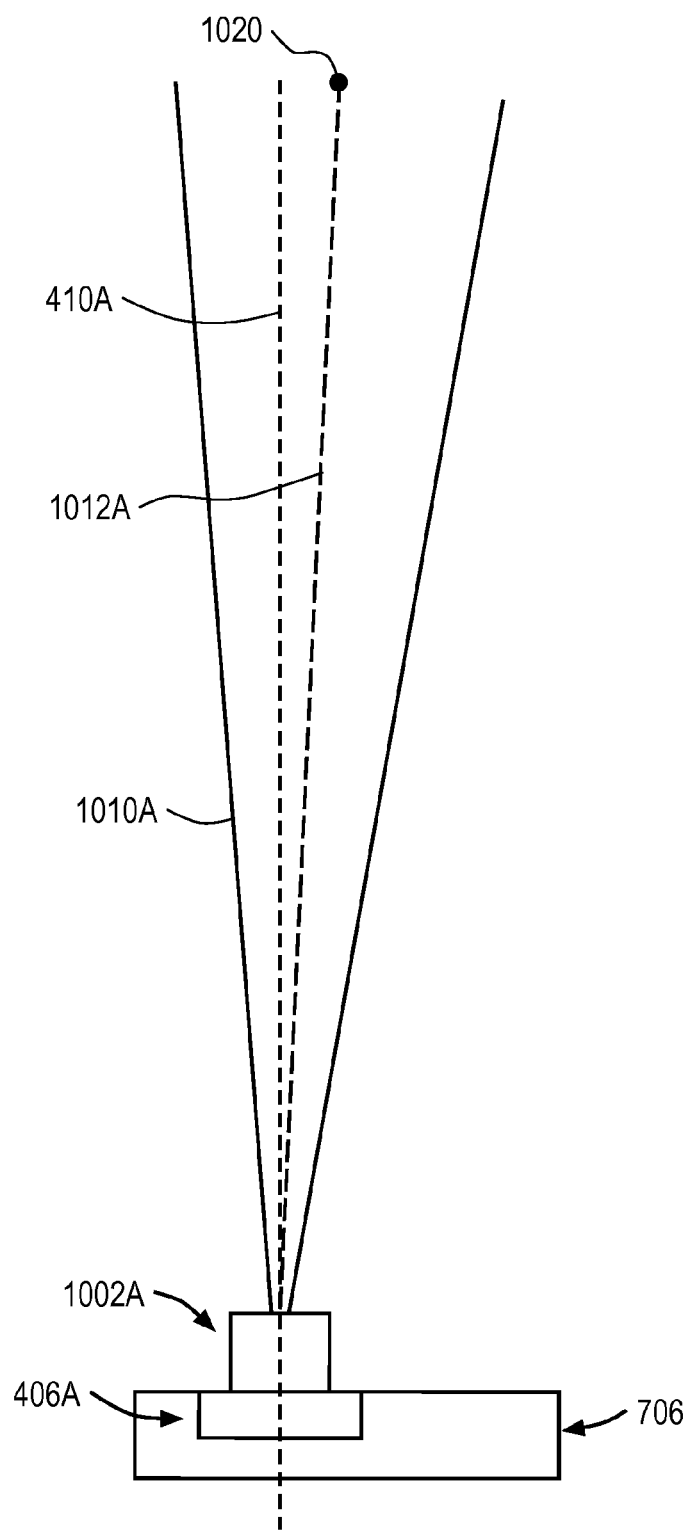
FIG. 10B is a simplified schematic view of the operation illustrated in FIG. 10A.

FIG. 10B illustrates the optical alignment of lens assembly 1002A described in FIG. 10A. In particular, from this view, it can be seen that the optical axis 1012A of lens assembly 1002A is aligned with a target 1020, which is at a predetermined z distance from the image sensor 406A. In addition, it is noted that the optical axis 1012A may be offset with respect to the image sensor axis 410A. Once aligned, lens assembly 1002A is mounted to the dual overmolded image sensor module 706 so that it is fixed at the alignment position. In addition, FOV 1010A may be aligned with target 1020 (e.g. optically centered using target 1020).

Figure 11A:
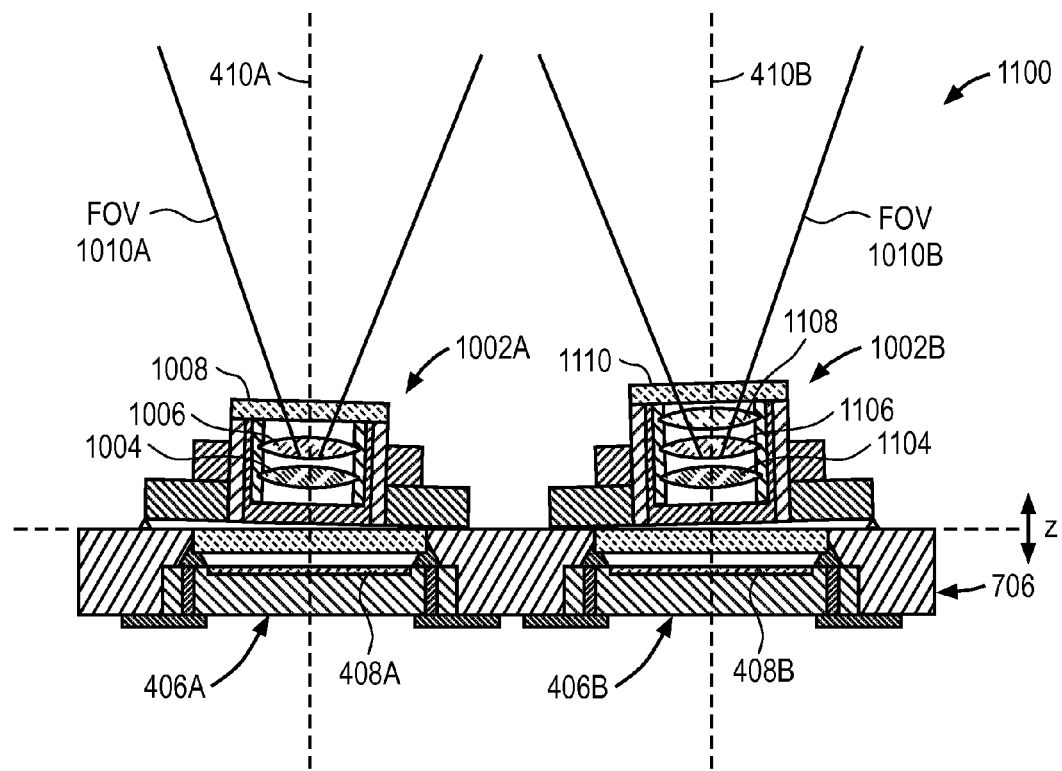
FIG. 11A is a pictorial view illustrating an operation for forming a dual overmolded camera module in accordance with one embodiment.

FIG. 11A illustrates the further processing operation of attaching a lens assembly to the other image sensor device within the dual overmolded image sensor module of FIG. 9. Representatively, lens assembly 1002B, such as one of those previously discussed in reference to FIG. 1, may be positioned over image sensor device 406B and optically aligned. It should be recognized that since image sensor device 406B is molded to image sensor device 406A by the mold material, lens assembly 1002A and lens assembly 1002B can be aligned with one another on the same dual overmolded image sensor module 706. In other words, lens assemblies 1002A, 1002B are not optically aligned separately on two separate image sensor device modules (e.g. image sensor devices separated by a sawing operation), and later aligned with one another. Rather, because the positions of image sensor devices 406A, 406B are already fixed with respect to one another by the mold material and will not change, lens assemblies 1002A, 1002B can be aligned with one another during manufacturing.

Lens assembly 1002B may include lenses 1104, 1106, 1108 and an external window 1110. The lenses 1104, 1106, 1108 may further have a field of view 1010B, which defines the angular extent of the scene or object that can be imaged using the lenses. In addition, lenses 1104, 1106, 1108 may be fixed focal length lenses such that the lenses do not move during an imaging operation. In one aspect, the focal length of the lens assembly 1002B may be different than the focal length of the lens assembly 1002A such that a magnified or zoomed image may be reconstructed from the image data obtained by the devices without moving the lenses, as previously discussed. The lens assembly 1002B may be attached to the dual overmolded image sensor module 706 using any standard technique. For example, lens assembly 1002B may be positioned over image sensor device 406B and then attached using an adhesive, mechanical, chemical or other suitable attachment technique.

Figure 11B:
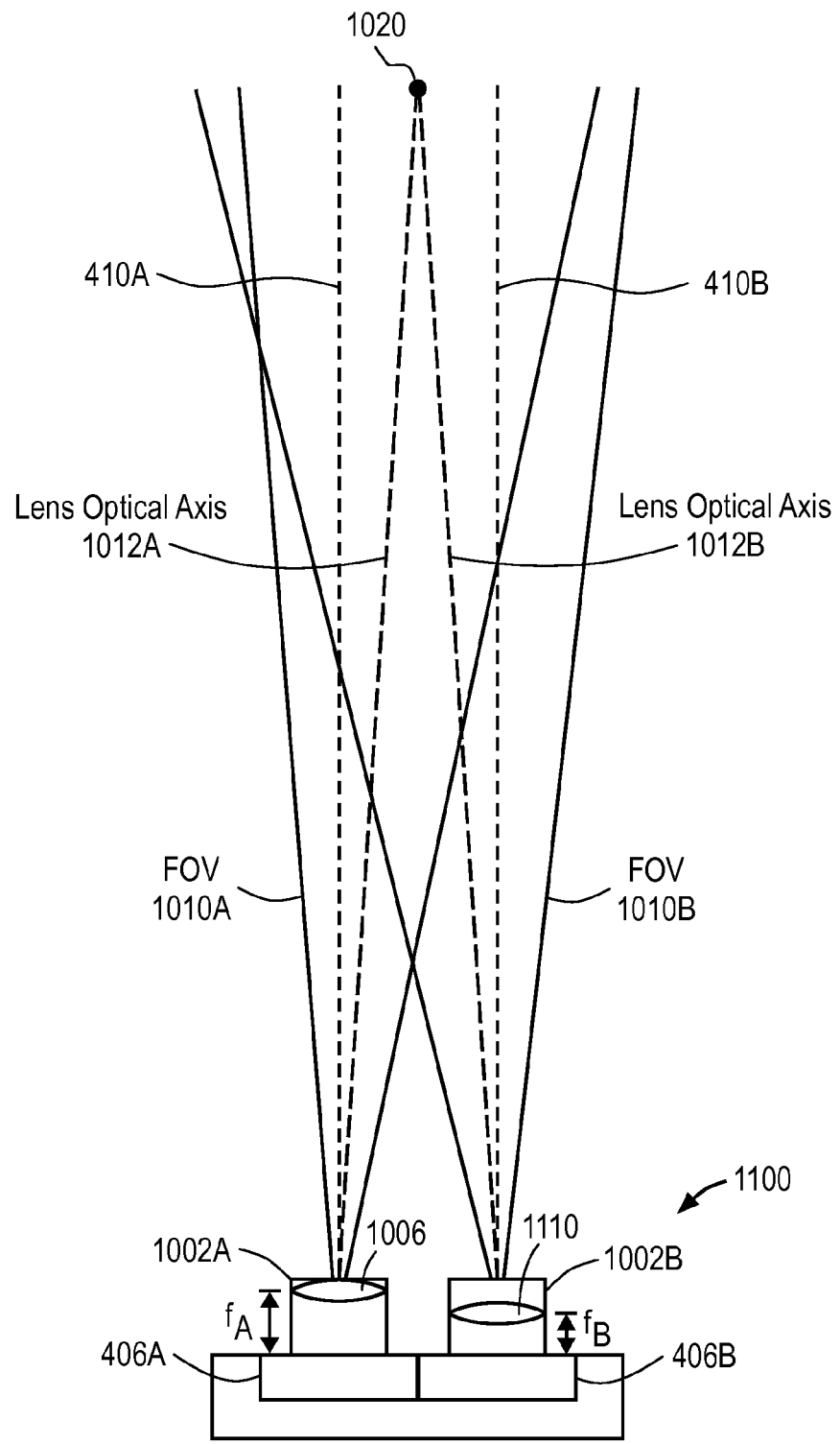
FIG. 11B is a simplified schematic view of the operation illustrated in FIG. 11A.

FIG. 11B illustrates the optical alignment of lens assembly 1002B described in FIG. 11A. In particular, from this view, it can be seen that the optical axis 1012B of lens assembly 1002B is also aligned with target 1020, which is at a predetermined z distance from the image sensor device 406B. In addition, it is noted that the optical axis 1012B may be offset with respect to the image sensor axis 410B in order to align optical axis 1012B with the target 1020. FOV 1010B may also be aligned with target 1020 (e.g. optically centered using target 1020). Still further, FIG. 11B shows lens assembly 1002A having a shorter focal length, and in turn a narrower FOV 1010A, than lens assembly 1002B, thus the image data obtained from the associated devices can be used to reconstruct a magnified or zoom image without having to move the lenses.

Once aligned, lens assembly 1002B is mounted to the dual overmolded image sensor module 706 so that it is fixed at the alignment position, to form a dual overmolded camera module 1100. In this aspect, the dual overmolded camera module 1100 includes two image sensor devices and associated lens assemblies that are both mechanically and optically aligned during manufacturing. In particular, image sensor devices 406A, 406B within the dual overmolded camera module 1100 are fixed with respect to one another at the previously discussed x, y and z alignment by the mold material. In other words, the dual overmolded camera module 1100 is a single unit with only two image sensor devices 406A, 406B mounted therein and fixed at predetermined alignment positions with respect to one another. Said another way, image sensor devices 406A and 406B within the dual overmolded camera module 1100 are inseparable, and therefore do not need to be separately aligned after manufacturing for use within an electronic device. Rather, the mechanical and optical alignment of all the components within the dual overmolded camera module (e.g. image sensor devices 406A, 406B and lens assemblies 1002A, 1002B) is complete and module 1100 is ready for implementation within the desired electronic device.

Figure 12:
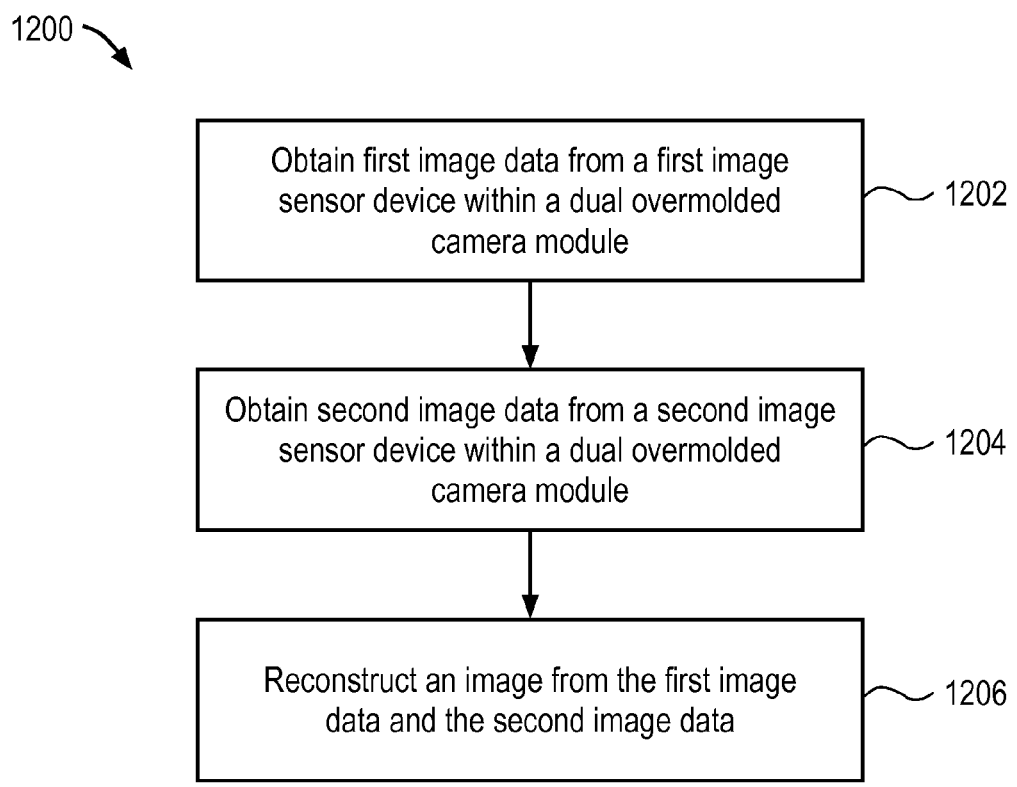
FIG. 12 is a flowchart of a method of reconstructing an image using image data from a dual overmolded camera module.

FIG. 12 illustrates one embodiment of a process for reconstructing an image using the dual overmolded camera module 1100. Representatively, process 1200 may include obtaining first image data from a first image sensor device within a dual overmolded camera module (e.g. image sensor device 406A) (block 1202). Process 1200 may further include obtaining second image data from a second image sensor device within a dual overmolded camera module (e.g. image sensor device 406B) (block 1204). The first image data and the second image data may then be used to reconstruct an image, for example, a magnified or zoom image, using any suitable image processing software (block 1206).

It should further be recognized that the processing operations described in FIG. 2-FIG. 11B allow for the formation of a very compact dual camera module with fewer processing operations, which is therefore easier to manufacture. For example, the resulting dual camera module may have the smallest possible z-height dimension from the bottom of the die to the transparent member due to the elimination of the ceramic substrate carrier. In addition, the x and y dimensions of the dual camera module may be reduced because a single casing is molded directly to, and contacts, exposed surfaces of both image sensor devices within the module. Still further, the manufacturing process is simplified because some post manufacturing operations typically used in assembling singulated camera modules within an electronic device are no longer necessary, for example, operations such as mechanically and optically aligning two separate camera modules with one another.

Figure 13:
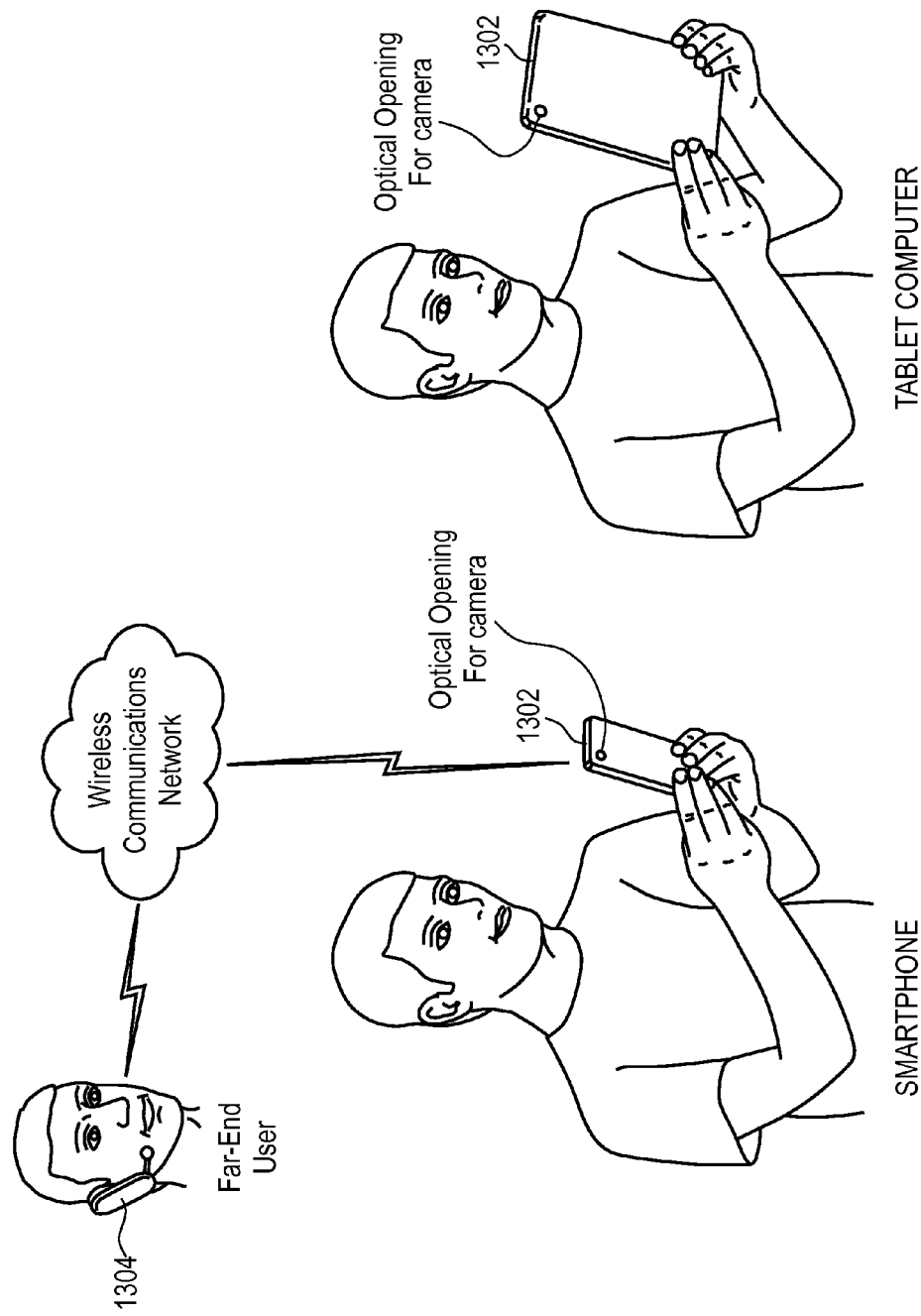
FIG. 13 illustrates one embodiment of a simplified schematic view of one embodiment of an electronic device in which a dual overmolded camera module may be implemented.

FIG. 13 illustrates one embodiment of a simplified schematic view of one embodiment of an electronic device in which a dual overmolded camera module may be implemented. As seen in FIG. 13, the dual overmolded camera module may be integrated within a consumer electronic device 1302 such as a smart phone with which a user can conduct a call with a far-end user of a communications device 1304 over a wireless communications network; in another example, the dual overmolded camera module may be integrated within the housing of a tablet computer. These are just two examples of where the dual overmolded camera module described herein may be used, it is contemplated, however, that the dual overmolded camera module may be used with any type of electronic device in which a dual camera module assembly is desired, for example, a tablet computer, a desk top computing device or other display device.

Figure 14:
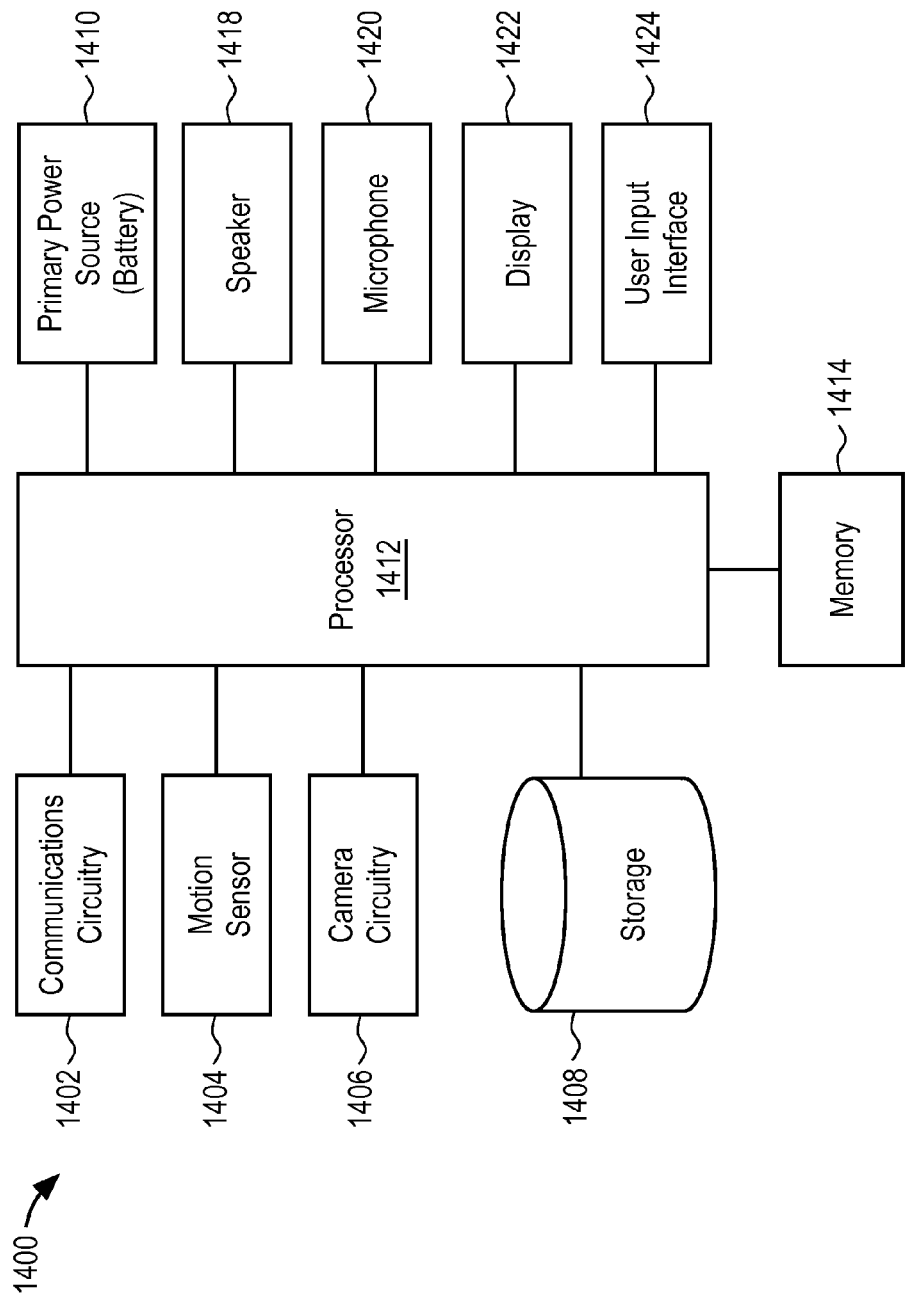
FIG. 14 illustrates a block diagram of some of the constituent components of an embodiment of an electronic device in which an embodiment of the invention may be implemented.

FIG. 14 illustrates a block diagram of some of the constituent components of an embodiment of an electronic device in which an embodiment of the invention may be implemented. Device 1400 may be any one of several different types of consumer electronic devices. For example, the device 1400 may be any camera-equipped mobile device, such as a cellular phone, a smart phone, a media player, or a tablet-like portable computer.

In this aspect, electronic device 1400 includes a processor 1412 that interacts with camera circuitry 1406, motion sensor 1404, storage 1408, memory 1414, display 1422, and user input interface 1424. Main processor 1412 may also interact with communications circuitry 1402, primary power source 1410, speaker 1418, and microphone 1420. The various components of the electronic device 1400 may be digitally interconnected and used or managed by a software stack being executed by the processor 1412. Many of the components shown or described here may be implemented as one or more dedicated hardware units and/or a programmed processor (software being executed by a processor, e.g., the processor 1412).

The processor 1412 controls the overall operation of the device 1400 by performing some or all of the operations of one or more applications or operating system programs implemented on the device 1400, by executing instructions for it (software code and data) that may be found in the storage 1408. The processor 1412 may, for example, drive the display 1422 and receive user inputs through the user input interface 1424 (which may be integrated with the display 1422 as part of a single, touch sensitive display panel). In addition, processor 1412 may send an audio signal to speaker 1418 to facilitate operation of speaker 1418. In addition, processor 1412 may also be used to reconstruct an image, for example a magnified or zoomed image, from image data obtained by the dual overmolded camera module within device 1400.

Storage 1408 provides a relatively large amount of "permanent" data storage, using nonvolatile solid state memory (e.g., flash storage) and/or a kinetic nonvolatile storage device (e.g., rotating magnetic disk drive). Storage 1408 may include both local storage and storage space on a remote server. Storage 1408 may store data as well as software components that control and manage, at a higher level, the different functions of the device 1400.

In addition to storage 1408, there may be memory 1414, also referred to as main memory or program memory, which provides relatively fast access to stored code and data that is being executed by the processor 1412. Memory 1414 may include solid state random access memory (RAM), e.g., static RAM or dynamic RAM. There may be one or more processors, e.g., processor 1412, that run or execute various software programs, modules, or sets of instructions (e.g., applications) that, while stored permanently in the storage 1408, have been transferred to the memory 1414 for execution, to perform the various functions described above.

The device 1400 may include communications circuitry 1402. Communications circuitry 1402 may include components used for wired or wireless communications, such as two-way conversations and data transfers. For example, communications circuitry 1402 may include RF communications circuitry that is coupled to an antenna, so that the user of the device 1400 can place or receive a call through a wireless communications network. The RF communications circuitry may include a RF transceiver and a cellular baseband processor to enable the call through a cellular network. For example, communications circuitry 1402 may include Wi-Fi communications circuitry so that the user of the device 1400 may place or initiate a call using voice over Internet Protocol (VOIP) connection, transfer data through a wireless local area network.

The device may include a microphone 1420. In this aspect, microphone 1420 may be an acoustic-to-electric transducer or sensor that converts sound in air into an electrical signal. The microphone circuitry may be electrically connected to processor 1412 and power source 1410 to facilitate the microphone operation (e.g. tilting).

The device 1400 may include a motion sensor 1404, also referred to as an inertial sensor, that may be used to detect movement of the device 1400. The motion sensor 1404 may include a position, orientation, or movement (POM) sensor, such as an accelerometer, a gyroscope, a light sensor, an infrared (IR) sensor, a proximity sensor, a capacitive proximity sensor, an acoustic sensor, a sonic or sonar sensor, a radar sensor, an image sensor, a video sensor, a global positioning (GPS) detector, an RF or acoustic doppler detector, a compass, a magnetometer, or other like sensor. For example, the motion sensor 1404 may be a light sensor that detects movement or absence of movement of the device 1400, by detecting the intensity of ambient light or a sudden change in the intensity of ambient light. The motion sensor 1404 generates a signal based on at least one of a position, orientation, and movement of the device 1400. The signal may include the character of the motion, such as acceleration, velocity, direction, directional change, duration, amplitude, frequency, or any other characterization of movement. The processor 1412 receives the sensor signal and controls one or more operations of the device 1400 based in part on the sensor signal.

The device 1400 also includes camera circuitry 1406 that implements the digital camera functionality of the device 1400. A camera module having image sensor devices (e.g. dual overmolded camera module 100) is built into the device 1400, with each image sensor device located at a focal plane of an optical system that includes a respective lens. An optical image of a scene within the camera's field of view is formed on the image sensor, and the sensor responds by capturing the scene in the form of a digital image or picture consisting of pixels that may then be stored in storage 1408. The camera circuitry 1406 may also be used to capture video images of a scene.

Device 1400 also includes primary power source 1410, such as a built in battery, as a primary power supply.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A dual overmolded camera module comprising:
   a dual overmolded image sensor module having an overmold casing molded to a first image sensor device and a second image sensor device, the first image sensor device and the second image sensor device spaced from one another in an x-direction at a predetermined alignment distance by the overmold casing positioned between the first image sensor device and the second image sensor device, and wherein at least one of the first image sensor device and the second image sensor device have a conductive via formed therethrough and a redistribution layer along at least one side; and
   a first lens assembly and a second lens assembly are positioned on, and mounted to, the overmold casing molded to the first image sensor device and the second image sensor device, and wherein the first lens assembly and the second lens assembly are optically aligned with a common target.

2. The dual overmolded camera module of claim 1 wherein each of the first image sensor device and the second image sensor device comprise a microelectronic die through which the conductive via is formed, an image sensor positioned along a top side of the microelectronic die, and a transparent member positioned over a side of the image sensor opposite the microelectronic die, and wherein the overmold casing directly contacts the top side of the microelectronic die and a portion of the transparent member of the first image sensor device and the second image sensor device.

3. The dual overmolded camera module of claim 1 wherein each of the first image sensor device and the second image sensor device comprise a microelectronic die having a top side and a sidewall perpendicular to the top side, an image sensor positioned along the top side, and the sidewall of the microelectronic die of the first image sensor device faces the sidewall of the microelectronic die of the second image sensor device, and the overmold casing directly contacts the sidewalls such that the predetermined alignment distance between the first image sensor device and the second image sensor device is fixed.

4. The dual overmolded camera module of claim 1 wherein the first image sensor device and the second image sensor device are aligned with one another at a predetermined alignment distance in a y-direction.

5. The dual overmolded camera module of claim 1 wherein the first image sensor device and the second image sensor device are level with one another in a z-direction.

6. The dual overmolded camera module of claim 1 wherein the first lens assembly has a first fixed focal length and the second lens assembly has a second fixed focal length.

7. The dual overmolded camera module of claim 6 wherein the first fixed focal length is different than the second fixed focal length.

8. The dual overmolded camera module of claim 6 wherein the first fixed focal length is longer than the second fixed focal length.

9. A dual overmolded camera module comprising:
a first image sensor device and a second image sensor device molded within a mold material at a predetermined separation in an x-direction, and each of the first image sensor device and the second image sensor device comprising a microelectronic die through which a conductive via is formed, and an image sensor positioned along a top side of the microelectronic die, and wherein the mold material directly contacts, and forms a casing that conforms to, the top side and a sidewall of the microelectronic die of each of the first image sensor device and the second image sensor device; and
a first lens assembly and a second lens assembly are positioned over the first image sensor device and the second image sensor device, respectively, to form a dual overmolded camera module, and wherein an optical axis of each of the first lens assembly and the second lens assembly are aligned with a common alignment target.

10. The dual overmolded camera module of claim 9 wherein the dual overmolded camera module is one inseparable unit operable to be positioned as one inseparable unit within an electronic device.

11. The dual overmolded camera module of claim 9 wherein the first image sensor device and the second image sensor device are maintained at the predetermined separation in the x-direction within the dual overmolded camera module by the mold material.

12. The dual overmolded camera module of claim 9 wherein the sidewall of the first image sensor device faces the sidewall of the second image sensor device, and the casing occupies an entire space between the first image sensor device and the second image sensor device within the dual overmolded camera module.

13. The dual overmolded camera module of claim 9 wherein the first image sensor device and the second image sensor device are aligned with respect to one another in a y-direction within the dual overmolded camera module.

* * * * *